(12) United States Patent
Dicker et al.

(10) Patent No.: US 6,975,603 B1
(45) Date of Patent: Dec. 13, 2005

(54) SYSTEM AND METHOD FOR MINIMIZING THE LOSS OF INFORMATION IN CORDLESS COMMUNICATIONS

(75) Inventors: Olaf Dicker, Austin, TX (US); Uwe Sydon, Round Rock, TX (US)

(73) Assignee: Siemens Communications Inc., Boca Raton, FL (US)

( * ) Notice: Subject to any disclaimer, the term of this patent is extended or adjusted under 35 U.S.C. 154(b) by 0 days.

(21) Appl. No.: 09/378,108

(22) Filed: Aug. 20, 1999

(51) Int. Cl.$^7$ .............................................. H04B 1/713
(52) U.S. Cl. ..................................... 370/329; 375/132
(58) Field of Search ................................ 375/132, 133; 370/942, 431, 337, 341, 347, 348, 229; 455/403, 455/422, 426, 462, 465, 62, 450, 452, 464, 455/509

(56) References Cited

U.S. PATENT DOCUMENTS

| | | | | |
|---|---|---|---|---|
| 4,716,573 A | * | 12/1987 | Bergstrom et al. ........... | 375/132 |
| 5,134,710 A | * | 7/1992 | .ANG.kerberg ............. | 370/280 |
| 5,197,093 A | * | 3/1993 | Knuth et al. ................. | 455/464 |
| 5,323,447 A | * | 6/1994 | Gillis et al. .................. | 455/464 |
| 5,848,095 A | * | 12/1998 | Deutsch ....................... | 375/133 |
| 5,907,812 A | * | 5/1999 | Van De Berg ............... | 455/426 |
| 6,009,332 A | * | 12/1999 | Haartsen ...................... | 455/450 |
| 6,091,758 A | * | 7/2000 | Ciccone et al. ............. | 370/330 |
| 6,115,407 A | * | 9/2000 | Gendel et al. ............... | 375/132 |
| 6,128,327 A | * | 10/2000 | Bird et al. ................... | 375/132 |
| 6,130,885 A | * | 10/2000 | Izumi et al. ................. | 370/343 |
| 6,134,227 A | * | 10/2000 | Magana ....................... | 370/280 |
| 6,151,352 A | * | 11/2000 | Taki et al. ................... | 375/132 |
| 6,240,126 B1 | * | 5/2001 | Ohashi et al. ............... | 375/132 |
| 6,246,713 B1 | * | 6/2001 | Mattisson .................... | 375/132 |
| 6,249,540 B1 | * | 6/2001 | Dicker et al. ................ | 375/133 |
| 6,259,722 B1 | * | 7/2001 | Dicker et al. ................ | 375/132 |
| 6,269,086 B1 | * | 7/2001 | Magana et al. ............. | 370/280 |
| 6,272,353 B1 | * | 8/2001 | Dicker et al. ................ | 375/132 |
| 6,289,006 B1 | * | 9/2001 | Schobl ........................ | 370/330 |
| 6,360,077 B2 | * | 3/2002 | Mizoguchi .................... | 455/63 |
| 6,363,059 B1 | * | 3/2002 | Kranz et al. ................. | 370/337 |
| 6,377,609 B1 | * | 4/2002 | Brennan, Jr. ................ | 375/133 |
| 6,400,751 B1 | * | 6/2002 | Rodgers ...................... | 375/132 |

(Continued)

FOREIGN PATENT DOCUMENTS

WO        WO 98/48586        10/1998

OTHER PUBLICATIONS

Chiani et al. "Frequency and Interference Diversity in Slow Frequency Hopping Multiple Access Systems". IEEE Personal, Indoor and Mobile Radio Communications. Oct. 15-18, 1996. pp. 648-652.*

(Continued)

*Primary Examiner*—Ricky Ngo
*Assistant Examiner*—Derrick W Ferris

(57) ABSTRACT

The present invention comprises a system and method for minimizing the loss of information in cordless communications. The system comprises a first data station (12) having control logic (11) operable to establish a plurality of individual communication channels (12a–12d) between the base station (12) and second data station (13). Each of the channels is associated with a unique channel frequency. The control logic (11) is also operable to select a first unique channel frequency to be used for the first channel (12a) between the two data stations (12–13), determine parameters relating to a spectral separation between each of the channels (12a–12d), and select unique channel frequencies for the remainder of the plurality of channels (12b–12d) in response to the determined parameters. The system also comprises response logic (19) residing in the second data station (13) that is operable to receive the information from the first data station (12) on the plurality of communication channels (12a–12d).

21 Claims, 2 Drawing Sheets

U.S. PATENT DOCUMENTS 6,480,721 B1 * 11/2002 Sydon et al. ............... 455/464

OTHER PUBLICATIONS

DeiBner et al. "Interference Analysis of a Total Frequency Hopping GSM Cordless Telephone". IEEE Personal, Indoor and Mobile Radio Communications. Sep. 8-11, 1998. pp. 1525-1529.*

Zander et al. "Adaptive frequency hoppihn in HF communications". IEEE Proceedings. Apr. 1995. pp. 99-105.*

Noll et al. "A Frequency Hopping for Cordless Telephone Systems". IEEE Universal Personal Communications. Oct. 5-9, 1998. pp. 1273-1277.*

Kashorda et al. "A Spectrum Efficient Technique for Cordless Telephone Access to ISDN". IEEE Mobile Radio and Personal Communications. Dec. 11, 1989-Dec. 14, 1989. pp. 15-19.*

Optimal Dynamic Channel Allocation Through ISM Band Profile Construction, by Slim Soussi pp. 136-138 (Motorola Jun. 1997).

PCT Search Report dateted Oct. 6, 2000.

* cited by examiner

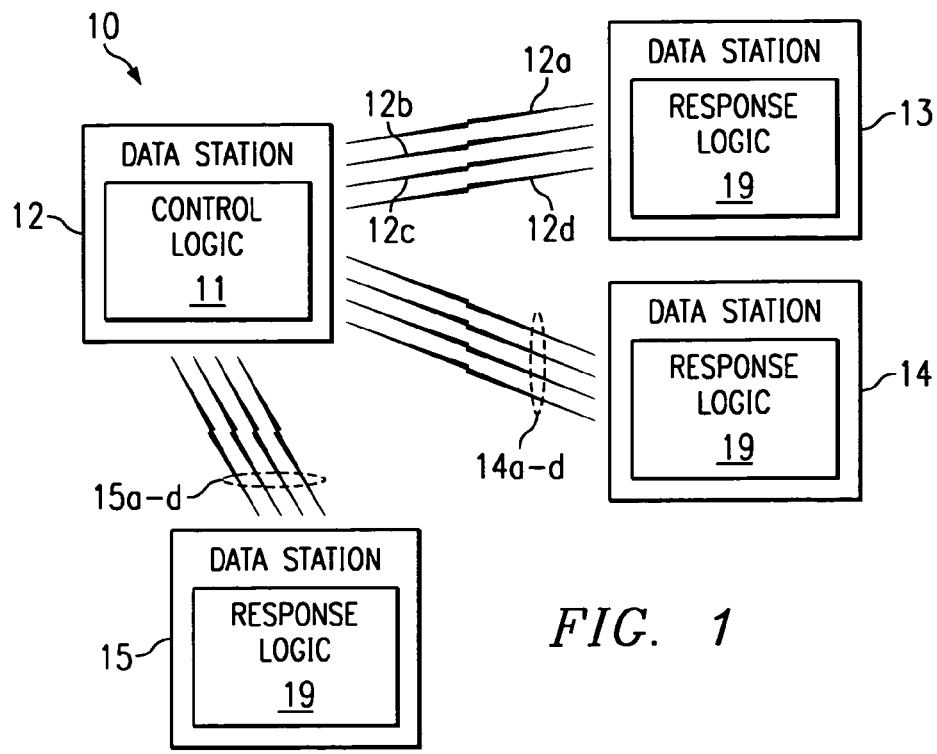
FIG. 1
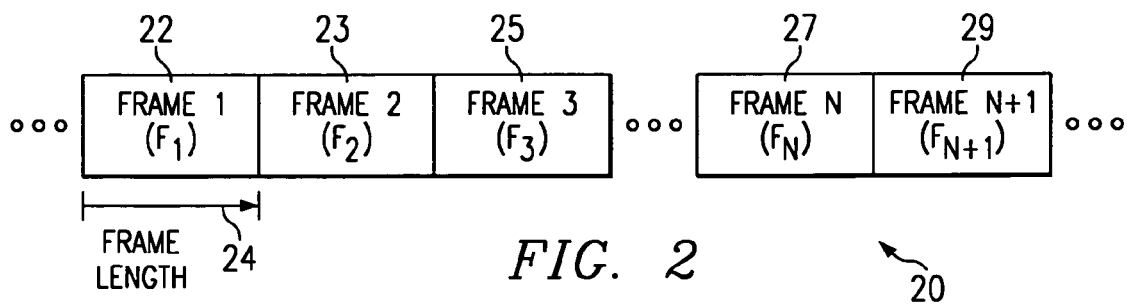
FIG. 2
| SUBSET | 0 | 1 | 2 | 3 | 4 | 5 | 6 | 7 | 8 | 9 | 10 | 11 | }30 |
|---|---|---|---|---|---|---|---|---|---|---|---|---|---|
| CHANNEL | 0...7 | 0...7 | 0...7 | 0...7 | 0...7 | 0...7 | 0...7 | 0...7 | 0...7 | 0...7 | 0...7 | 0...7 | }32 |
| FREQUENCY | 0...7 | 8...15 | 16... | | | | | | | | | ...95 | }34 |
2.4 GHz          2.4835 GHz
FIG. 3

SYSTEM AND METHOD FOR MINIMIZING THE LOSS OF INFORMATION IN CORDLESS COMMUNICATIONS

TECHNICAL FIELD OF THE INVENTION

This invention relates generally to telecommunications and more particularly to a system and method for minimizing the loss of information in cordless communications.

BACKGROUND OF THE INVENTION

In conventional cordless systems there are generally at least two data stations supporting point-to-point communications. These data stations typically communicate utilizing a plurality of channels or communication links that may be used in simplex or duplex mode. One of the data stations in such systems acts as the master with the other acting as a slave. The master data station determines the timing with and synchronizes the slave data station. A function of the master data station is to establish and control the communication channels with the slave data station. It is known to communicate between the data stations utilizing a time division multiplex, time division duplex method. The master data station then selects a frequency to use for the plurality of channels whenever the master data station communicates with the slave data station. A problem arises when interference occurs near the carrier frequency used for the communication channels between the data stations. Such interference may affect the quality of the communication channels between the data stations. In those circumstances, all of the communication channels may suffer from degraded quality. In such circumstances, such interference over the communication link between the base station and the second cordless unit generally results in a loss of information. This problem frustrates users and has been a long standing challenge to the developers of cordless communication devices. Minimizing such losses of information in data systems is especially challenging, and typically requires the use of additional system resources.

Therefore, a need has arisen for a new method and system for cordless communications that overcomes the disadvantages and deficiencies of the prior art.

SUMMARY OF THE INVENTION

In accordance with the present invention, a method and system for cordless communications is disclosed that provides for minimizing the loss of information transmitted over channels between at least two data stations.

In one embodiment of the present invention, a system for minimizing the loss of information in cordless communications is disclosed. The system comprises a first data station having control logic for establishing a plurality of individual communication channels needed to transmit information between the first data station and the second data station. Each of the channels is associated with a unique channel frequency. The control logic is further operable to select a first unique channel frequency to be used for the first channel between the two data stations, to determine parameters relating to a spectral separation between each of the channels, and select unique channel frequencies for the remainder of the plurality of channels in response to the determined parameters. The system also comprises response logic residing in the second data station that is operable to receive the information from the first data station on the plurality of communication channels.

In another embodiment of the present invention, a method is disclosed for minimizing the loss of information in cordless communications comprising four steps. In step one, a plurality of individual communication channels between at least two data stations are established. In step two, a first unique carrier frequency to be used for the first of the plurality of channels is selected. In step three, parameters relating to achieving a maximum throughput of information over the channels between the data stations are determined. In step four, additional unique carrier frequencies to be used for the remainder of the plurality of channels are selected, in response to the determined parameters.

A technical advantage of the present invention is the ability to automatically determine parameters relating to minimizing the loss of information over a plurality of channels between one data station and at least a second data station. The first data station may then determine a spacing between the plurality of channels to minimize the loss of information transmitted between the two data stations.

Other technical advantages should be apparent to one or ordinary skill in the art in view of the specification, drawings, and claims.

BRIEF DESCRIPTION OF THE DRAWINGS

For a more complete understanding of the present invention, the objects and advantages thereof, reference is now made to the following description taken in connection with the accompanying drawings in which:

FIG. 1 is a block diagram of one embodiment of a cordless communication system in accordance with the present invention.

FIG. 2 is a block diagram of one embodiment of frame frequencies used in a frequency hopping cordless communication system in accordance with the present invention.

FIG. 3 is a diagram of one embodiment of subdividing a band used in a frequency hopping cordless communication system in accordance with the present invention.

DETAILED DESCRIPTION OF THE DRAWINGS

Figure 4:
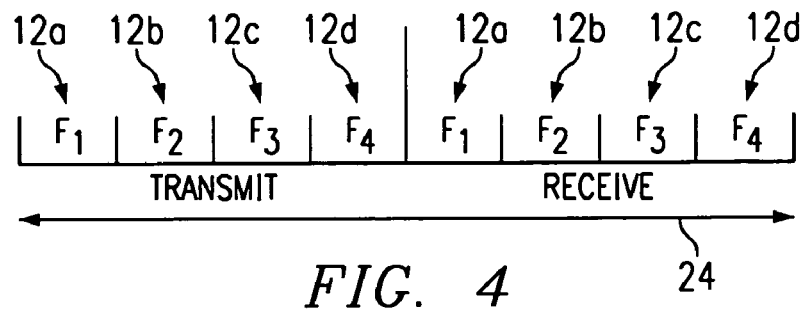
FIG. 4 is a diagram of one embodiment of transmit and receive channels used in one frame of a frequency hopping cordless communication system in accordance with the present invention.

The preferred embodiment of the present invention and its advantages are best understood by referring to FIGS. 1 through 5 of the drawings, like numerals being used for like and corresponding parts of the various drawings.

FIG. 1 is a block diagram of one embodiment of wireless or cordless communication system 10. System 10 comprises two data stations 12 and 13. While two data stations have been shown for illustrative purposes, it should be understood by those skilled in the art that additional data stations can be added without departing from the spirit of the invention. Data station 12 may be coupled to data station 13 via at least one corresponding individual communication link 12a to support point-to-point communication using radio frequencies. Additional communication links 12b–12d may be used to support point-to-point communications between data stations 12 and 13, depending on a bandwidth that may be required by system 10. Data station 12 may also be coupled to additional data stations 14 and 15 to support point-to-multipoint communication using radio frequencies.

Data station 13 can be physically located anywhere within the communication range of data station 12. Either of the data stations may be in a fixed location or may be mobile. Data station 12 can communicate with data station 13 using a time division multiplexed (TDM) frame based communication protocol. For example, each frame can be ten milliseconds (10 ms) in duration and typically includes transmit and receive channels for communication and control data. Data station 12 typically operates as a master to synchronize communications with data station 13. Data station 12 is operable to communicate with data station 13 using radio frequencies, many methods for which are known to those skilled in the art. One such method utilizes spread spectrum technology. One example of such technology includes frequency hopping spread spectrum communications.

Each frequency used by system 10 is subject to different atmospheric or other environmental conditions that may affect the quality of the communication links, or channels, 12a–12d. For example, a nearby microwave tower may be broadcasting on a similar radio frequency to that used by channel 12a. On the other hand, other suitable frequencies that are usable for channels 12a–12d may not be subject to such interference from the microwave tower that is broadcasting on but one radio frequency.

It is desirable to maximize the throughput of information transmitted between data stations 12 and 13. Typically such maximization includes utilizing as many channels 12a–12d as possible, in a configuration suited to system 10 needs. Such configuration is discussed in further detail in conjunction with FIG. 4. Such maximization also includes minimizing the loss of information due to errors over channels between data stations 12 and 13. To minimize the loss of information communicated between data stations 12 and 13 over individual channels 12a–12d, data station 12 has control logic 11 operable to select a plurality of channels such as 12a–12d, according to the bandwidth for data or information throughput required by system 10. Control logic 11 is also operable to select a frequency to use for channel 12a, and to determine parameters for evaluating the interference encountered on channel 12a, such as a bit error rate. Other parameters are known to those skilled in the art. Control logic 11 is also operable to determine from the parameters a spectral separation from channel 12a for channels 12b–12d. Control logic is also operable to determine from the parameters whether to change the frequency used for channel 12a. Data station 13 has response logic 19 residing therein for establishing such a channel with data station 12.

It is particularly advantageous to minimize the loss of information over channels 12a–12d when such information comprises data rather than voice information. Minimizing the loss of data in system 10 typically requires large processing and memory resources to store and reprocess lost data. To reduce the need for such resources, it is particularly advantageous to utilize unique carrier frequencies on each of channels 12a–12d. In this way, interference from for example, the microwave tower, will only be encountered on one of the channels 12a that may be broadcasting on a similar radio frequency. On the other hand, the remaining channels 12b–12d will not be subject to similar interference because they are spectrally isolated from the interfering frequency used by the microwave tower. Thus, the information loss encountered by channel 12a due to that spectral interference will not occur over these channels 12b–12d. In this way, the information loss is statistically distributed over time, thus reducing the loss of information in consecutive transmissions.

In addition, within system 10, a frequency hopping scheme can address a number of implementation problems by accomplishing dynamic frequency selection. As one example, frequency hopping is useful in bands such as the ISM (Industrial, Scientific and Medical) band. One advantage of the ISM band is that it is unlicensed, and does not require a license fee for use. Thus, it is used by many vendors for various types of mobile or cordless devices (e.g., medical monitoring devices, wireless LANs, printers, speakers, security systems and in-building mobile communication systems). Consequently, radio frequency interference can be a significant problem when using this band. Use of such ISM-based devices is regulated by and must follow Federal Communications Commission (FCC) guidelines in the United States. For example, devices are allowed to communicate at a particular frequency only with a defined bandwidth for a defined period of time and within a defined signal power level. In the embodiment of FIG. 1, system 10 can use the ISM band extending from 2.4 GHz to 2.4835 GHz for supporting communication between data stations. However, in order to operate within FCC or other government regulations, system 10 implements a frequency hopping scheme. This allows system 10 to support robust cordless communications in the ISM band while operating within regulation guidelines.

By implementing such a frequency hopping scheme on an individual basis for each mobile unit, system 10 may avoid the use of bad frequencies due to radio frequency interference and other problems. Under the frequency hopping scheme, data stations 12 and 13 generally communicate on channel 12a by moving in sync in the time domain from frequency to frequency. As additional channels 12b–12d are needed, a typical frequency hopping scheme utilizes the same frequency for all communication channels 12a–12d by multiplexing each of the additional channels in the time domain within a frame. A data station 13 that is not initially in active communication with data station 12 may "listen" at a specific radio frequency to attempt to lock on to data station 12. When data station 12 hops to that specific frequency, data station 13 can identify and receive control data transmitted by data station 12. This allows data station 13 to lock with data station 12 in sync with the frequency hopping scheme. By implementing such a frequency hopping scheme on an individual basis for each channel 12a–12d between data stations 12 and 13, system 10 may more effectively distribute the loss of information due to radio frequency interference over time on channels 12a–12d to data station 13, and improve on other problems. Details illustrating such a frequency hopping scheme are discussed in further detail in conjunction with FIGS. 2 and 3.

Such a scheme to minimize the loss of information can also be used with any algorithm to improve channel quality and to prevent interference with multiple data stations in system 10. Thus, the scheme should be consistent across any multiple data stations, yet attempt to ensure that adjacent data stations do not select the same frequencies and interfere with one another. Also, the scheme should avoid selecting frequencies yielding poor quality for individual channels. Further, the scheme should react to interference by separating the frequencies selected by a data station from possible interference from other data stations.

FIG. 2 is a block diagram of one embodiment of frame frequencies for a frequency hopping communications system. As shown, a frame structure 20 comprises a plurality of frames 22, 23, 25, . . . 29, . . . each having a frame length 24. Frame 23 follows immediately after the previous frame 22 in the time domain, and so on. In the embodiment of FIG.

2, a different frequency ($F_1$, $F_2$, $F_3$ ... $F_N$, $F_{N+1}$, ...) is associated with channel 12a in each frame 22, 23, ... and is used during that frame 22, 23, ... for communication on a channel between data stations 12 and 13. This change from frequency to frequency is handled by a frequency hopping scheme implemented by data stations 12 and 13. Other frequencies ($F_2$, $F_3$ ... $F_N$, $F_{N+1}$, ...) are selected for the remaining channels 12b–12d during that frame 22, 23, .... During the duration of a given frame 22, data stations 12 and 13 communicate using the selected frequencies for that frame 22. When the next frame 23 begins, data stations 12 and 13 communicate using a new set of selected frequencies. In one embodiment, frame length 24 is ten milliseconds; thus the frequency being used changes every ten milliseconds. Typically, data station 12 can communicate with data station 13 utilizing the frequencies that have the best quality available at that time for each channel.

FIG. 3 is a diagram of one embodiment of subdividing the ISM band for a frequency hopping communications system. The ISM band used in this embodiment extends from 2.4 GHz to 2.4835 GHz. As mentioned, the FCC defines requirements for use of frequencies within the ISM band. For example, within a 30 second period, the regulations limit the maximum length of time that a system can use one frequency to 0.4 seconds. Thus, the total available frequencies needs to include seventy-five or more frequencies. In the embodiment of FIG. 3, this range is divided into twelve subsets 30, and each subset 30 is divided into eight channels 32. Each channel 32 is then associated with one of ninety-six frequencies 34 defined within and equally subdividing the ISM band. Frequencies 34 then provide a set of frequencies from which the frequency hopping scheme can select for each frame 22.

The frequency hopping scheme, in addition to selecting frequencies, may also implement a scheme for optimizing the quality for each individual channel. For example, a PCS microwave tower may interfere with frequencies in the ISM band in a particular region. Thus, system 10 would not want to use those frequencies in those on channels so affected. One such method to optimize the quality for an individual channel is to avoid such bad frequency subsets by blocking their selection from that channel. By dividing the ISM band into ninety-six frequencies, the embodiment of FIG. 3 provides sufficient frequencies to allow bad frequencies to be blocked while keeping the number of available frequencies above the seventy-five frequency threshold. For example, there is freedom to avoid using the frequencies within two subsets 30 without dropping below the seventy-five frequency threshold.

FIG. 4 is a diagram of one embodiment of a frame used in a frequency hopping cordless communication system. As shown, frame length 24 comprises a plurality of transmit and receive channels 12a–12d. Each channel follows immediately after the previous channel in the time domain. For example, transmit channel 12b immediately follows transmit channel 12a, and receive channel 12a immediately follows transmit channel 12d. In the embodiment of FIG. 4, frame length 24 is ten milliseconds, and the transmit and receive channels are symmetric over frame length 24. Thus, channels 12a–12d are operating in full duplex. It is within the scope of the invention for frame length 24 to be asymmetrically subdivided. For example, frame length 24 may comprise six transmit channels and two receive channels. In some embodiments, the selection of frequencies may be limited by the bandwidth available for system 10 to use. In such embodiments, the number of channels may be increased by narrowing the bandwidth of each channel. Such narrowing may be accomplished by a variety of methods known to those skilled in the art, such as optimizing the channel coding by a method such as using multi level modulations.

System 10 selects a unique frequency $F_1$, $F_2$, $F_3$, $F_4$ to be used for each of channels 12a–12d as illustrated in FIG. 4. Such frequencies may also be changed from frame to frame by utilizing a frequency hopping scheme such as discussed in conjunction with FIGS. 2 and 3. Each frequency utilized for channels 12a–12d is typically selected to maintain spectral separation between channels 12a–12d. Thus, for example, it is particularly advantageous to select $F_2$ from a different subset than $F_1$. Such spectral separation ensures that, should the frequency $F_1$ used over channel 12a encounter interference, frequencies $F_2$, $F_3$, and $F_4$ will not encounter interference from that same spectral band.

Such selection of unique frequencies for channels 12a–12d may be accomplished using a variety of methods known to those skilled in the art. Such methods may include a predetermined spectral separation, or a spectral spacing that is calculated from a variety of algorithms. Further, such spectral spacing may be accomplished adaptively, e.g., by modeling interference or quality parameters measured by system 10. Details on the operation of system 10 utilizing such a selection method are discussed in further detail in conjunction with FIG. 5.

Figure 5:
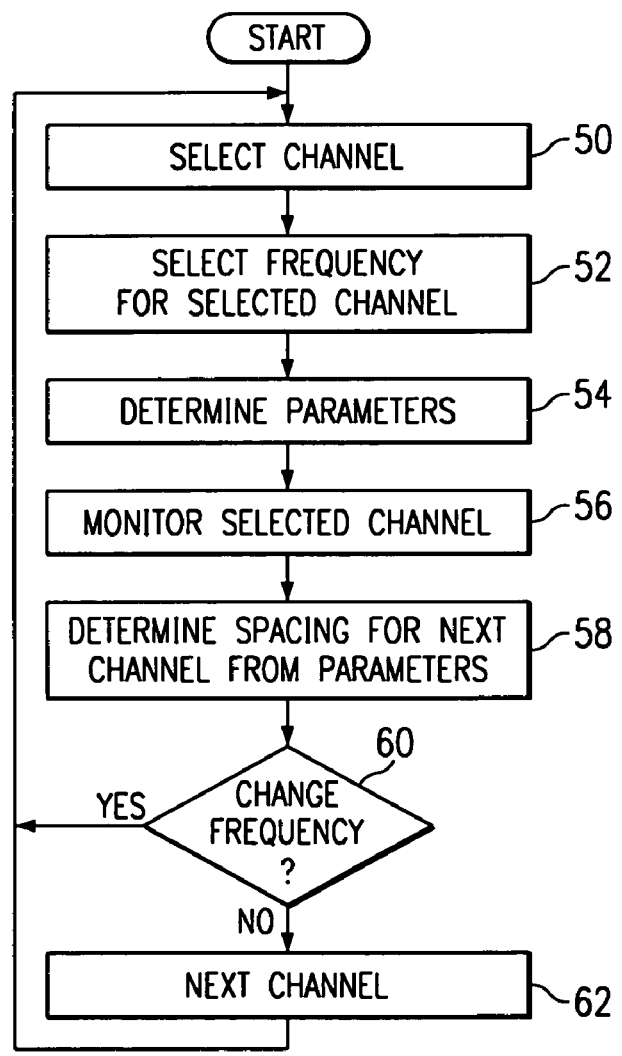
FIG. 5 is a flowchart for a method for cordless communications utilizing the teachings of the present invention.

FIG. 5 is a flowchart of one embodiment of a method for cordless communications in accordance with the present invention. The method of FIG. 5 can be implemented by data station 12 to minimize the loss of information in system 10. In general, the method of FIG. 5 includes the steps of data station 12 selecting a channel, selecting a frequency for the selected channel, determining parameters, determining a spacing for the next channel from the parameters, and determining whether to change the frequency on the selected channel if the selected channel is encountering too much interference. Data station 12 performs the method shown in FIG. 5 for each data station, such as data station 13, with which it is in active communication.

The method of FIG. 5 comprises a number of steps, beginning with step 50. Data station 12 selects a channel 12a to activate or maintain an active channel with data station 13 at step 50. Such a channel may or may not support the bandwidth for data throughput needed. Should additional data throughput be required by system 10, additional channels 12b–12d will be added, as is discussed in step 62. At step 52, data station 12 selects a frequency to use for selected channel 12a. Data station 12 may utilize an operable radio frequency to communicate with data station 13. When selecting such a frequency, a range of such operable radio frequencies should be available for data station 12 to use. Thus if it is first establishing channel 12a, data station 12 may use, for example, either a default set of frequencies available or the last frequencies available for the prior active channel with that data station. As mentioned above with respect to FIG. 3, one embodiment of system 10 defines twelve different subsets for grouping channels within the ISM band. One embodiment for the method of FIG. 5 operates to select for use the current best ten out of the twelve available subsets, and to block the remaining two subsets because those subsets represent poor quality for that channel.

In general, the method of FIG. 5 also includes step 54 for determining parameters. Such parameters include, for example, those that may reveal whether channel 12a is encountering too much interference. For example, one parameter that may be revealed in step 54 represents the radio signal strength measured on channel 12a as received over channel 12a from data station 13. Other parameters may include error rates associated with each subset, including bit error rates. These error rates reflect conditions encountered on the communication link such as (a) bad packet data, indicated by a bad synchronization word or (b) bad cyclic redundancy code (CRC). The first error rate used in this embodiment is measured over a short period of time, whereas the second error rate is measured over a longer period of time. Consequently, the first error rate can be referred to as the short-term error rate, and the second error rate can be referred to as the long-term error rate. It is also within the scope of the invention for system 10 to measure other parameters that may assist in determining the quality of the frequency used on the communication link between base station 12 and that mobile unit. In some embodiments, data station 12 will determine parameters by including step 56 for monitoring channel 12a between data station 12 and data station 13. In one embodiment for example, data station 12 models interference encountered on channel 12a. Such modeling may permit more adaptive determination of parameters during the operation of system 10. It is also within the scope of the invention for system 10 to monitor and model other parameters that may assist in determining whether the channel is encountering too much interference between data stations, in step 56.

Data station 12 then determines from the parameters a spectral spacing or separation to be used for at least the next channel 12b. Such a spectral spacing ensures that additional channels 12b–12d, if necessary, will be spectrally isolated from 12a. Such isolation minimizes a loss of information, should channel 12a be subject to interference as measured by the parameters determined in step 54. Should the interference be broadband, such spectral spacing may need to be large. Conversely, if the parameters reveal interference from, for example, instruments utilizing one radio signal, such spectral spacing may be small. Such spectral spacing may comprise a frequency offset that is calculated from an algorithm, table, or predetermined value. It is also within the scope of the invention for data station 12 to optimize such spectral spacing in order to narrow the bandwidth for each of the channels 12a–12d. Many methods are known to those skilled in the art, including optimizing the channel coding by a method such as using multi level modulations.

Data station 12 evaluates whether the selected frequency used for channel 12a should be changed, at step 60. Such a determination may be adaptive, or be performed according to predetermined time intervals or thresholds. One such method includes a frequency-hopping scheme as discussed in conjunction with FIGS. 2 and 3. Another determination that can be made is whether channel 12a subject to too much interference. In one embodiment of the invention, such a determination is made if a bit error rate is unacceptable. Should the channel be subject to too much interference, a loss of information that is being transmitted between data stations 12 and 13 will occur. After such identification has been performed, the method of FIG. 5 includes step 62 for selecting a next channel 12b. Such a selection is typically necessary in systems 10 to support the large bandwidth required to maximize information or data throughput by providing parallel channel communications between data stations 12 and 13.

It is within the scope of the invention for data station 12 to perform steps 50–62 at predetermined intervals. In addition, data station 12 may perform these steps adaptively. For example, data station 12 may determine parameters in step 56 at a predetermined interval, and in response to these parameters, immediately change the frequency on that channel in step 60. Data station 12 may also in response to these parameters alter the spectral spacing for the next channel in step 62. Data station 12 may also additionally make determinations on parameters for all channels between data station 12 and the other data stations.

Steps 50–62 in FIG. 5 are performed for each data station in system 10. At any time, a data station may deactivate its channel to data station 12. At this point, data station 12 then no longer performs steps 52–62 for that data station, but continues the steps of selecting, determining, and changing for each of the other data stations in system 10 that is actively communicating with data station 12.

The method of FIG. 5 may also include selecting parameters to optimize the transmission quality of channel 12a in step 54. Such optimization may be accomplished by a variety of methods known to those skilled in the art. They may also be encoded or passed to the data station as tabular data. Response logic 19 in data station 13 communicates with data station 12 utilizing a variety of methods known to those skilled in the art. Such methods may include the use of control data and synchronizing parameters initiated by data station 12. For example, data station 12 may wait until data station 13 is ready to utilize the parameters, if such waiting may be necessary in an embodiment where seamlessness is required to avoid the loss of synchronization between the data stations.

The flowchart of FIG. 5 illustrates one embodiment of a method for minimizing the loss of information in cordless communications. Such a method may be implemented in a variety of technologies known to those skilled in the art. For example, various algorithms may be implemented in software, firmware or hardware. As another example, methods for determining parameters measured on an individual channel between the data stations may be implemented in a table. Furthermore, such algorithms may be changed dynamically to varying conditions encountered by system 10. In this way, system 10 can continue to minimize the loss of information within system 10.

While the invention has been particularly shown and described by the foregoing detailed description, it will be understood by those skilled in the art that various other changes in form and detail may be made without departing from the spirit and scope of the invention.

What is claimed is:

1. A system for minimizing the loss of information in cordless communications, comprising:
    a first data station having control logic, the control logic operable to:
        establish a plurality of individual communication channels of a frame, the communication channels operable to transmit information between the first data station and a second data station, each communication channel associated with a frequency of a frequency subset of a plurality of frequency subsets, a frequency band divided to yield the plurality of frequency subsets;
        select a first channel frequency from a first frequency subset of the plurality of frequency subsets, the first channel frequency to be used for the first channel between the two data stations;
        measure one or more parameters for evaluating interference of the first channel during transmission;
        determine based on the one or more measured parameters a spectral separation from the first channel; and
        select a unique channel frequency for at least one other channel based on the first channel and the determined spectral separation, the unique channel frequency selected from a second frequency subset of the plurality of frequency subsets, the second frequency subset different from the first frequency subset; and response logic residing in the second data station, the response logic operable to receive the information from the first data station on the plurality of communication channels.

2. The system of claim 1, wherein the channels are operable to both transmit and receive information in duplex.

3. The system of claim 1, the interference measured by a bit error rate of the first channel.

4. The system of claim 3, wherein the bit error rate comprises either a short-term error rate or a long-term error rate.

5. The system of claim 1, wherein each channel frequency is changed using a frequency hopping scheme.

6. The system of claim 1, wherein the control logic is further operable to:
   a) model interference encountered over individual channels between the data stations; and
   b) select parameters that minimize the loss of information over each of the individual channels.

7. A method for minimizing the loss of information in cordless communications, comprising:
   a) establishing a plurality of individual communication channels between at least two data station, the plurality of communication channels corresponding to a frame, each communication channel associated with a frequency of a frequency subset of a plurality of frequency subsets, a frequency band divided to yield the plurality of frequency subsets;
   b) selecting a first carrier frequency from a first frequency subset of the plurality of frequency subsets, the first carrier frequency to be used for a first of the plurality of channels;
   c) measuring one or more parameters for evaluating interference of the first carrier frequency during transmission;
   d) determining based on the one or more measured parameters a spectral separation from the first carrier frequency relating to achieving a maximum throughput of information over the channels between the data stations; and
   e) selecting a second carrier frequency for at least one other channel based on the first carrier frequency and the determined spectral separation, the second carrier frequency selected from a second frequency subset of the plurality of frequency subsets the second frequency subset different from the first frequency subset.

8. The method of claim 7, wherein the maximum throughput of information over the channels is equal to the maximum throughput of information over the plurality of channels.

9. The method of claim 7, wherein the determining step further comprises measuring error rates for a plurality of frequencies usable for each of the channels.

10. The method of claim 7, wherein the determining step further comprises:
   a) modeling interference over one of the channels; and
   b) selecting parameters that minimize the loss of information over the plurality of channels.

11. The method of claim 7, further comprising determining parameters relating to achieving a maximum throughput of information over the channels between the data stations at predetermined intervals of time.

12. The method of claim 7, further comprising changing the frequency of each channel utilizing a frequency hopping scheme.

13. The method of claim 12, wherein the selecting a unique frequency step comprises separating all of the frequencies at an optimal spectral separation.

14. The method of claim 7, further comprising selecting the unique frequency of the at least one other channel from a table.

15. A method for minimizing the loss of information in cordless communications, comprising:
   a) providing at least two data stations having a plurality of communication channels of a frame to transmit information between the data stations, each communication channel associated with a frequency of a frequency subset of a plurality of frequency subsets, a frequency band divided to yield the plurality of frequency subsets;
   b) selecting a first carrier frequency for a first of the channels between the data stations, the first carrier frequency selected from a first frequency subset of the plurality of frequency subsets;
   c) measuring one or more parameters for evaluating interference of the first carrier frequency during transmission;
   d) determining based on the one or more measured parameters a spectral separation from the first of the channels;
   e) repeating the steps for another channel; and
   f) selecting carrier frequencies for all of the plurality of channels based on the determined spectral separations and the first channel, a carrier frequency selected for a second channel from a second frequency subset of the plurality of frequency subsets, the second frequency subset different from the first frequency subset.

16. The method of claim 15, wherein the determining a spectral separation step further comprises determining parameters to yield an optimal spectral separation.

17. The method of claim 15, wherein the determining parameters step further comprises;
   a) evaluating whether any signal source is interfering with the channel between the data stations on the first unique carrier frequency; and
   b) selecting another carrier frequency for the channel.

18. The method of claim 16, wherein the parameters represent an error rate measured over the channel.

19. The method of claim 15, further comprising the data stations transmitting information that is time division multiplexed and time division duplexed over the communication channels.

20. The method of claim 15, wherein steps (b)–(e) are performed at regular intervals of time.

21. An apparatus for minimizing the loss of information in cordless communications comprising control logic, the control logic operable to:
   select a first channel frequency associated with one of a plurality of communication channels of a frame, each communication channel associated with a frequency of a frequency subset of a plurality of frequency subset a frequency band divided to yield the plurality of frequency subsets, the first channel frequency selected from a first frequency subset of the plurality of frequency subsets;
   access a plurality of frequency sets, each frequency of a frequency set corresponding to a channel;
   remove any poor quality frequency set from the plurality of frequency sets;

measure one or more parameters for evaluating interference of the first channel during transmission;
determine based on the one or more measured parameters a spectral separation from the first channel frequency; and
select at least one channel frequency for the remainder of the plurality of channels based on the determined spectral separation and selected from at least one of the plurality of frequency sets, the at least one channel frequency selected from a second frequency subset of the plurality of frequency subsets, the second frequency subset different from the first frequency subset.

* * * * *

UNITED STATES PATENT AND TRADEMARK OFFICE
CERTIFICATE OF CORRECTION

PATENT NO.      : 6,975,603 B1
DATED           : December 13, 2005
INVENTOR(S)     : Olaf Dicker et al It is certified that error appears in the above-identified patent and that said Letters Patent is hereby corrected as shown below:

<u>Title page,</u>
Item [75], Inventors, add -- Juergen Kockmann, Austin, TX (US) --.

Signed and Sealed this

Twenty-first Day of March, 2006

JON W. DUDAS
*Director of the United States Patent and Trademark Office*